(12) United States Patent
Gross et al.

(10) Patent No.: US 6,259,081 B1
(45) Date of Patent: Jul. 10, 2001

(54) DEVICE FOR RECEIVING A TRANSMISSION SIGNAL AND FOR TRANSMITTING AN OPTICAL BEAM AND METHOD OF USING THE DEVICE

(75) Inventors: Walter Gross, Herzogenaurach; Ekkert Bartosch, Erlangen; Franz-Josef Unterlass, Adelsdorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/500,409

(22) Filed: Feb. 8, 2000

Related U.S. Application Data

(63) Continuation of application No. PCT/DE98/02113, filed on Jul. 27, 1998.

(30) Foreign Application Priority Data

Aug. 8, 1997 (DE) .............................................. 197 34 510

(51) Int. Cl.[7] .................................................. G02B 27/00
(52) U.S. Cl. .................. 250/205; 250/227.11; 73/862.59
(58) Field of Search .............................. 250/205, 227.11, 250/227.21, 551; 73/862.59

(56) References Cited

U.S. PATENT DOCUMENTS 4,345,482 * 8/1982 Adolfsson et al. ............. 250/227.21
5,099,144   3/1992 Sai .

FOREIGN PATENT DOCUMENTS

4240721A1   6/1994 (DE) .
0433481A1   6/1991 (EP) .

OTHER PUBLICATIONS

Published International Application No. 92/14227 (Jensen et al.), dated Aug. 20, 1992.

* cited by examiner

*Primary Examiner*—Stephone B. Allen
(74) *Attorney, Agent, or Firm*—Herbert L. Lerner; Laurence A. Greenberg; Werner H. Stemer

(57) ABSTRACT

A device is provided for receiving a transmission signal and for transmitting an optical beam having an adjustable intensity, wherein the optical beam effects the transmission signal. A transmitter for transmitting the beam has a controller for setting the intensity. A receiver for receiving the transmission signal has an analyzer for outputting a threshold signal if the strength of the transmission signal exceeds a predetermined limit value. A pick-up outputs a start signal for starting the transmission signal. A control unit is connected to the analyzer, the pick-up and the controller. After reception of the start signal from the pick-up, the control unit sets the intensity at the controller to a value which rises continuously from essentially zero until the analyzer outputs the threshold signal, and then leaves the controller unchanged until reception of a new start signal. A method is also provided for using the device together with a measuring device configured as a transceiver, in an electrical power distribution network.

13 Claims, 3 Drawing Sheets

DEVICE FOR RECEIVING A TRANSMISSION SIGNAL AND FOR TRANSMITTING AN OPTICAL BEAM AND METHOD OF USING THE DEVICE

CROSS-REFERENCE TO RELATED APPLICATION

This application is a continuation of copending International Application No. PCT/DE98/02113, filed Jul. 27, 1998, which designated the United States.

BACKGROUND OF THE INVENTION

Field of the Invention

The invention relates to a device for receiving a transmission signal and for transmitting an optical beam having an adjustable intensity, wherein the optical beam effects the transmission signal, including a transmitter for transmitting the beam having a controller for setting the intensity, and a receiver for receiving the transmission signal having an analyzer for outputting a threshold signal if the strength of the transmission signal exceeds a predetermined limit value. The invention also relates to a method of using the device.

Such a device is known and is used, for example, in a measuring configuration which carries out measurements in an electrical power distribution installation and includes a corresponding measuring unit that has to be operated at a high electrical potential. The measuring unit is supplied with power through an optical beam. The beam can be fed to the measuring unit for that purpose through an optical waveguide. A transmission signal, which communicates results of measurements of whatever kind, is transmitted as an optical signal, likewise through an optical waveguide, from the measuring unit. In that case, there is no need at all for an electrically conductive connection between a transmitter, which supplies the optical beam serving to supply power, the measuring unit and a correspondingly configured receiver, which receives the transmission signal and passes it on for further evaluation. An optical beam that is considered in that context is, in particular, a laser beam, emitted by a transmitter which is set up correspondingly, for example as a semiconductor laser. The measuring unit correspondingly includes a transmitting and receiving device which, on one hand, receives the optical beam as a power source and, on the other hand, outputs the transmission signal.

It is regularly the case in such a measuring configuration that there is no electrically conductive connection at all between the measuring unit, which is at a high electrical potential, and the remaining parts of the device, that are at normal zero potential. Therefore, it is not easily possible to set an appropriate intensity for the optical beam serving to supply power. As a rule, the setting must be performed manually in that the intensity is adjusted continuously upwards, proceeding from zero, until the measuring unit receives a sufficient amount of power for its transmission signal. Accordingly, it is necessary, when starting up the device, to increase the intensity of the optical beam until a transmission signal having an appropriately high strength, in particular a strength lying above a predetermined limit value, is received.

An additional impediment emerges when a semiconductor laser is used in the transmitter for the optical beam, since the efficiency of a semiconductor laser generally deteriorates due to aging. Therefore, in the course of operation, it is to be expected that the intensity of the optical beam decreases to such an extent that the transceiver can no longer be supplied properly. It has merely been known heretofore to set the intensity of the optical beam manually to a sufficiently high value in order to remedy such a situation.

SUMMARY OF THE INVENTION

It is accordingly an object of the invention to provide a device for receiving a transmission signal and for transmitting an optical beam and a method of using the device, which overcome the hereinafore-mentioned disadvantages of the heretofore-known devices of this general type and which permit automatic setting of an intensity of the optical beam and make manual intervention unnecessary.

With the foregoing and other objects in view there is provided, in accordance with the invention, a device for receiving a transmission signal and for transmitting an optical beam, the device comprising a transmitter for transmitting an optical beam having an adjustable intensity, the transmitter having a controller for setting the intensity; a receiver for receiving a transmission signal effected by the optical beam, the receiver having an analyzer for outputting a threshold signal if the transmission signal has a strength exceeding a predetermined limit value; a pick-up for outputting a start signal for starting the transmission signal; and a control unit connected to the analyzer, to the pick-up and to the controller, the control unit driving the controller, after reception of the start signal from the pick-up, for causing the controller to set the intensity to a value increasing continuously from substantially zero until the analyzer outputs the threshold signal, and the control unit then leaving the controller unchanged until reception of a new start signal.

In the sense of the invention, the intensity of the optical beam is increased continuously proceeding from essentially zero, that is to say proceeding from a value which does not suffice to effect a transmission signal, and at the same time an observation is made as to whether or not a transmission signal can be received. The increasing of the intensity is continued until a transmission signal of sufficient strength is received and the threshold signal is triggered. The latter stops the process of increasing the intensity.

Accordingly, the invention allows a measuring configuration of the type described, in which the device is integrated, to be reliably activated and deactivated repeatedly many times. Meanwhile, it is ensured during every activation process that an intensity of the optical beam is set which suffices for the purpose of receiving the desired transmission signal. Manual intervention is no longer necessary in this case.

In accordance with another feature of the invention, there is provided a regulator which is connected to the receiver, the transmitter, the analyzer and the controller and enables the intensity to be regulated after the threshold signal has been received. As a result, the device is supplemented by a regulated system which allows the intensity to be regulated in dependence on corresponding properties of the received transmission signal. This refinement is of particular interest for a device which is intended to be operated in each case without a break over comparatively long periods of time, so that impairment of the intensity of the optical beam during operation has to be expected.

In accordance with a further feature of the invention, the control unit has an integrator to which a constant signal can be fed for the purpose of integration and which is connected to the controller in order to set the intensity as a function of an integral of the constant signal. In this case, the constant signal may be a constant direct current and the integrator may be a capacitor with a downstream voltage amplifier having a high input impedance. The integral constitutes a linearly rising voltage signal which can be used in conjunction with a corresponding controller in order to set an essentially linear intensity rise.

In accordance with an added feature of the invention, there is provided a transceiver connected between the transmitter and the receiver. The transceiver receives the optical beam from the transmitter and transmits the transmission signal to the receiver. In this case, it is furthermore preferred for the transmitter and the transceiver to be set up to supply power to the transceiver through the optical beam. In addition, the transceiver preferably contains a measuring unit, from which measurement data can be transmitted to the receiver through the use of the transmission signal. Thus, these preferred developments of the device permit application thereof in the context of the measuring configuration (explained above) in an electrical power distribution network. According to an additional preferred development of the device, it is provided that the transceiver has a configuration for comparing the intensity with the limit value and for adding information about the comparison to the transmission signal. The analyzer and the control unit are set up for the purpose of setting the intensity to a continuously rising value if, according to the information, the intensity lies below the limit value.

As a result, a regulating loop is present which is directly incorporated in the loop including the transmitter and the transceiver and in which allows the intensity to be determined as a critical regulated variable directly at the load, namely the transceiver. In addition to a low outlay for apparatus, this affords extensive freedom from systematic faults during the determination of the intensity.

In accordance with an additional feature of the invention, there is provided a first optical waveguide, which is connected to the transmitter and is preferably provided for the purpose of guiding the optical beam.

In accordance with yet another feature of the invention, the transmission signal is also to be provided as an optical signal. The transmission signal is preferably fed to the receiver in addition through a second optical waveguide, which is correspondingly connected to the receiver. As an alternative, a single optical waveguide may be provided both for the purpose of guiding the optical beam and for the purpose of guiding the transmission signal. This is naturally supplemented by corresponding beam splitters in order to combine the optical beam and the transmission signal on the single optical waveguide and to accept them from the single optical waveguide and separate them from one another.

With the objects of the invention in view there is also provided a method of using the device, which comprises supplying a measuring unit with power through the optical beam; outputting the transmission signal from the measuring unit; and guiding the transmission signal output by the measuring unit to the receiver.

The device according to the invention is used, in particular, for the purpose of supplying a transceiver, for example with a measuring unit, with energy through the optical beam and for the purpose of guiding a transmission signal which is output by the transceiver and contains measurement data from the above-mentioned measuring unit, for example, to the receiver. In this case, the above-mentioned measuring unit is intended, in particular, for carrying out measurements in an electrical power distribution network. Given an appropriate configuration of the device, the transceiver can be completely free from ground potential and, in particular, can be at any necessary high electrical potential with respect to ground.

Other features which are considered as characteristic for the invention are set forth in the appended claims.

Although the invention is illustrated and described herein as embodied in a device for receiving a transmission signal and for transmitting an optical beam and a method of using the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
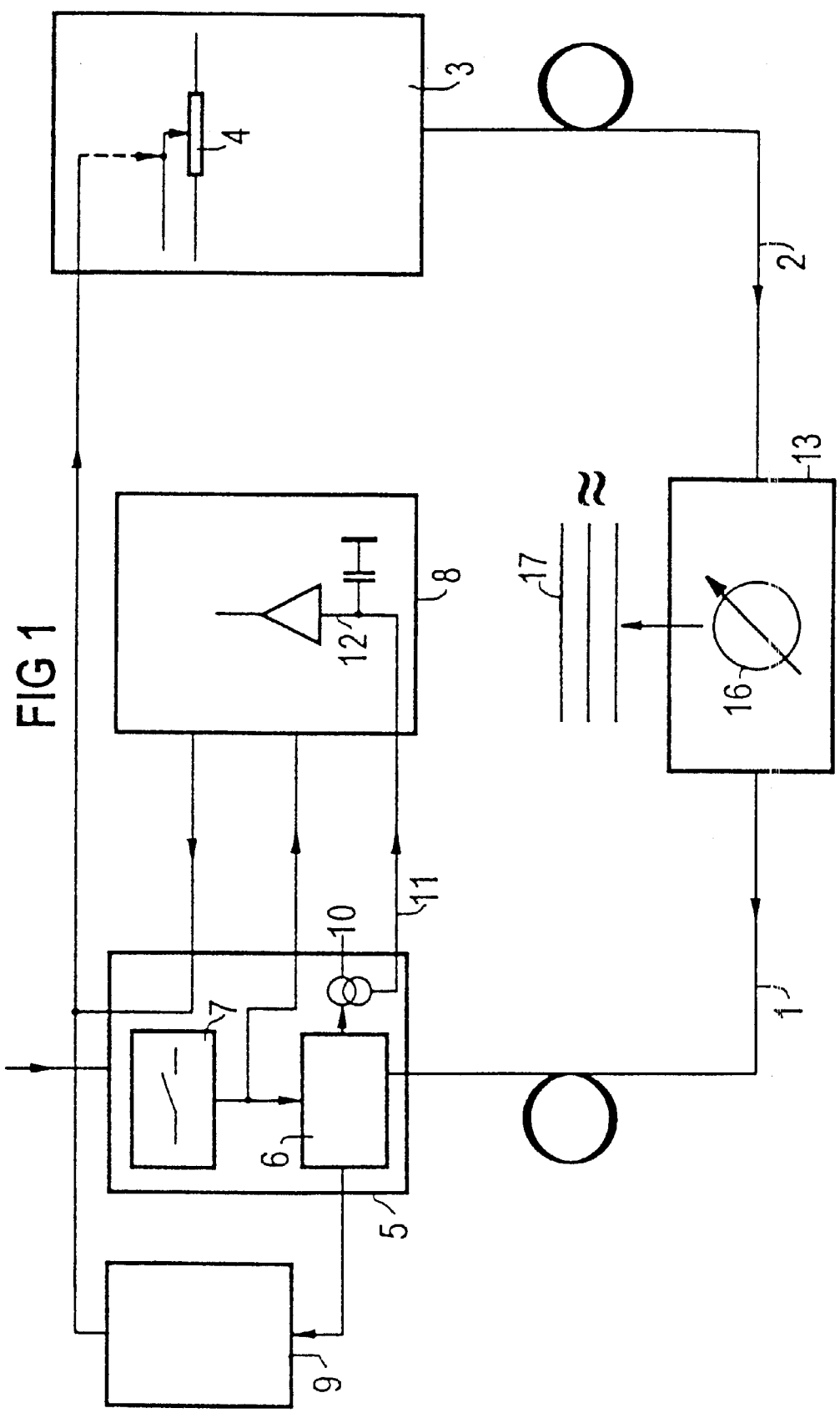
FIG. 1 is a schematic and block circuit diagram of an exemplary embodiment in which separate measures are employed for guiding an optical beam and for guiding a transmission signal.

Referring now to the figures of the drawings in detail and first, particularly, to FIG. 1 thereof, there is seen a device for receiving a transmission signal and for transmitting an optical beam. In this case, the transmission signal is provided as an optical signal, is intended to be guided through a first optical waveguide 1 and is effected through the use of the optical beam, which has an adjustable intensity and is intended to be guided through a second optical waveguide 2. The device includes a transmitter 3 for transmitting the beam. The transmitter 3 has a controller 4, indicated symbolically as a potentiometer, for setting the intensity of the beam. The second optical waveguide 2 for guiding the beam is connected to the transmitter 3. In addition, the device includes a receiver 5 which is connected to the first optical waveguide 1 for receiving the transmission signal. The receiver 5 includes an analyzer 6 for outputting a threshold signal if the strength of the transmission signal exceeds a predetermined limit value. In addition, the receiver 5 includes a pick-up 7 which has a function that is indicated symbolically by a switch and is provided for outputting a start signal for the purpose of starting the transmission signal. A control unit 8 is connected to the analyzer 6, the pick-up 7 and the controller 4. After reception of the start signal from the pick-up 7, the control unit 8 sets the intensity of the beam at the controller 4 to a value which rises continuously from essentially zero until the analyzer 8 outputs the threshold signal and thus stops the continuous rising of the value. The controller 4 then remains unchanged by the control unit 8 until reception of a new start signal.

In addition, the device includes a regulator 9 which is connected to the receiver 5, the transmitter 3, the analyzer 6 and the controller 4. The regulator 9 enables the intensity to be regulated by correspondingly changing the controller 4 after the threshold signal has been output, that is to say when the control unit 8 no longer changes the controller 4.

In order to initiate the optical beam and thus to effect the transmission signal, the device operates as follows: A start signal is fed both to the analyzer 6 and to the control unit 8 through the use of the pick-up 7. The analyzer 6 thereupon switches on a constant-current source 10, which feeds a constant signal in the form of a constant electrical current to the control unit 8 through a corresponding control line 11. In the control unit 8, this current passes to an integrator 12, which is represented by way of example as a capacitor with a downstream voltage amplifier, that outputs an output signal as an integral of the constant signal, which rises continuously over time from zero and may serve more or less immediately for controlling the controller 4. In the present case, the threshold signal to be output by the analyzer 6 causes the constant-current source 10 to be switched off. Consequently, the output signal of the integrator 12 no longer changes over time and accordingly can no longer effect a change of the controller 4. In the present case, a corresponding signal also passes from the analyzer 6 to the regulator 9. The nature of this signal is such that the regulator 9 and the control unit 8 do not interfere with one another during the influencing of the controller 4. More detailed explanations in this regard are unnecessary since the regulator 9 as well as the control unit 8 and further components of the device can be implemented by using customary digital or analogue electronics, within the scope of the knowledge and skills of those skilled in the appropriate art. The optical beam passes through the second optical waveguide 2 to a transceiver 13 which, as indicated symbolically, may contain a measuring unit 16. The measuring unit 16 is supplied with power through the beam and is used to obtain measurement data which are transmitted to the receiver 5 through the use of the transmission signal to be output by the transceiver 13 over the first optical waveguide 1.

Accordingly, the transceiver 13 is completely electrically isolated both from the transmitter 3 and the receiver 5. Therefore, assuming a correspondingly adapted construction, the transceiver 13 can be put at any desired, in particular very high, electrical potential without this potential being able to reach the transmitter 3 or the receiver 5. In particular, therefore, the transceiver 13 with the measuring unit 16 can be used at a high electrical potential in a distribution installation of a public electrical power distribution network 17, where measurements, for example measurements of electrical currents or voltages, are performed. The transceiver 13 could also be used in a closed space from which no electrical lines are routed, for whatever reasons. The only examples that will be mentioned herein are a zone where there is a risk of explosion or else an area having a high magnetic field strength, as occurs in magnetic resonance installations, for example. In this context, the transceiver 13 could be a sensor driven through the use of the optical beam and read through the use of the (optical) transmission signal.

Figure 2:
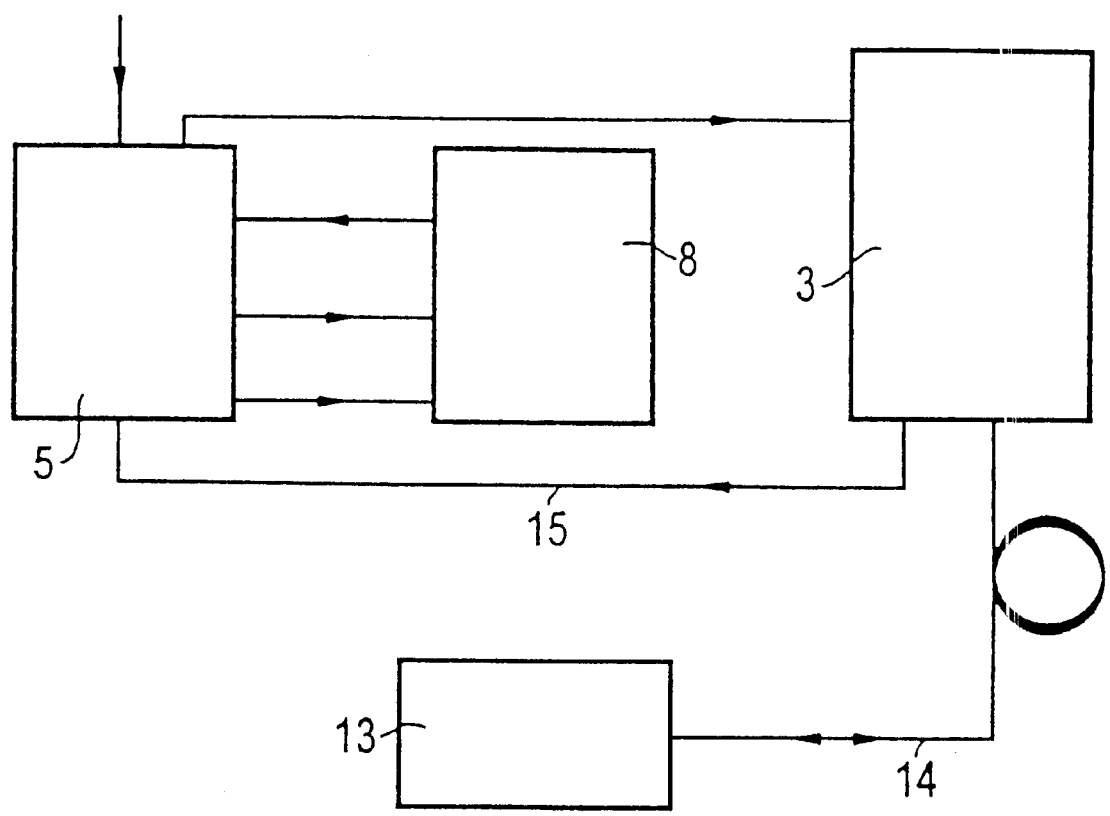
FIG. 2 is a block circuit diagram of an exemplary embodiment in which a single measure is provided both for guiding the optical beam and for guiding the transmission signal.

FIG. 2 shows a further exemplary embodiment of the device for receiving a transmission signal and for transmitting an optical beam having an adjustable intensity. Functionally, the device according to FIG. 2 corresponds in many respects to the device according to FIG. 1, with the result that in this respect the explanations with regard to FIG. 1 apply equally to FIG. 2 and are not repeated. The device again has a transmitter 3, a receiver 5 and a control unit 8 and it also contains a transceiver 13, to which the optical beam is fed and which outputs the transmission signal to be received. However, a single optical waveguide 14 is provided for the optical beam and the transmission signal. Therefore, the transmitter 3 contains a component which can separate the transmission signal from the optical beam, for example a corresponding beam splitter. Such components are familiar to those skilled in the relevant art and do not require a detailed description at this point. In any event, the transmission signal passes through a correspondingly provided data line 15 to the receiver 5, where it can be processed in the manner explained with reference to FIG. 1. It may be emphasized that, according to FIG. 2, the transmitter 3 can perform certain functions which the receiver 5 would have to carry out alone according to FIG. 1. It is in no way necessary for the data line 15 to be set up for a transmission of the transmission signal in the form of the original optical signal. It is entirely conceivable, and even advantageous under certain circumstances, to convert the optical transmission signal into a suitable electronic form as early as in the transmitter 3 and then to send it as an electronic signal through the data line 15 to the actual receiver 5.

With regard to the possible applications for the transceiver 13, what was said with respect to FIG. 1 applies directly.

Figure 3:
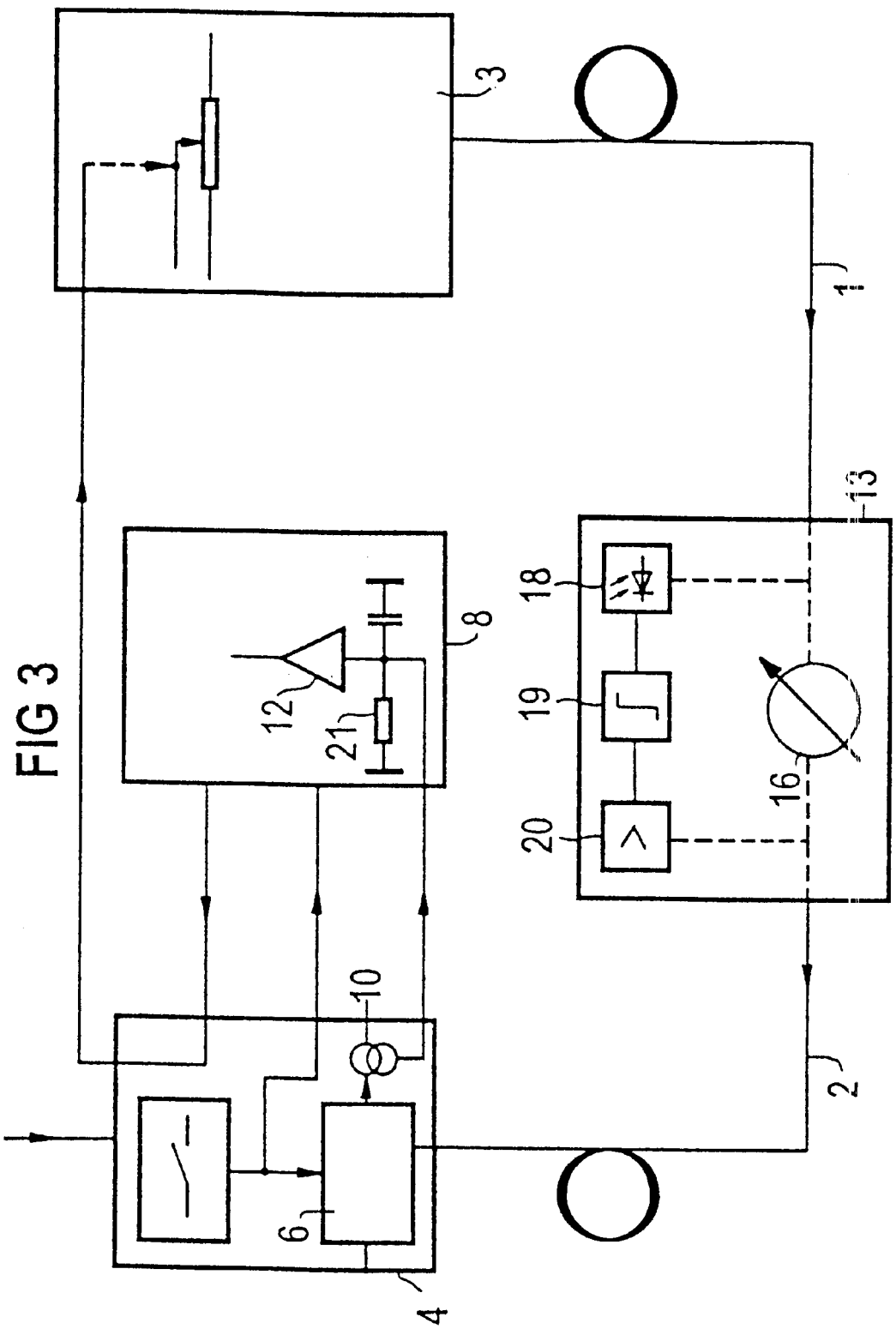
FIG. 3 is a schematic and block circuit diagram of an exemplary embodiment in which a regulating circuit for regulating an intensity of the optical beam is provided.

The exemplary embodiment according to FIG. 3 corresponds in many respects to the exemplary embodiment according to FIG. 1. Therefore, the explanation of FIG. 1 is to be enlisted in this respect for the explanation of FIG. 3. In the exemplary embodiment according to FIG. 3, the optical beam again passes from a transmitter 3 to a transceiver 13, where it serves essentially to supply power to a measuring unit 16. A transmission signal which is generated in the transceiver 13 is to be transmitted to a receiver 4, with details regarding measured values determined by the measuring unit 16. The receiver 4 has an analyzer 6 for analyzing the transmission signal, in the manner described. This analyzer 6 drives a control unit 8 by enabling a constant current to flow thereto from a constant-current source 10 that can be switched on and off. In the control unit 8, this current passes to an integrator 12, which generates an output signal that is fed in the manner described to the transmitter 3 for the purpose of controlling the intensity of the optical beam. The special feature of this exemplary embodiment is that it has a regulating circuit which is incorporated directly in the closed loop between the transmitter 3, the transceiver 13 and the receiver 4.

In this case, the transceiver 13 is supplemented by a device which determines the intensity of the optical beam being fed in and provides the transmission signal, to be transmitted to the receiver 4, with information which makes it possible to infer whether or not the intensity of the optical beam can be regarded as sufficient. In the exemplary embodiment, a detector 18, trigger 19 and a pick-up 20 are provided for this purpose. The detector 18, for example a photodiode, serves for determining the intensity. The trigger 19 outputs a signal from which it can be concluded whether the specific intensity lies above or below a certain minimum value. The pick-up 20 adds a corresponding item of information to the transmission signal to be transmitted by the transmitter 13. It is understood that the analyzer 6 is set up to be able to utilize this information. This lies within the scope of the skills of those skilled in the relevant art and does not require any further explanation at this point. The integrator 12, which in the present exemplary embodiment plays an important role as described with reference to FIG. 1, is supplemented by a discharge unit 21, in this case a resistor 21 connected in parallel with the capacitor of the integrator 12. This resistor causes the output signal of the integrator 12 to decrease with a certain time constant, rather than remain constant, after the constant-current source 10 has been switched off.

Correspondingly, the optical beam intensity set by the integrator 12 in the transmitter 3 also does not remain constant, but rather likewise decreases correspondingly. If the intensity has decreased to such an extent that the device including the detector 18, the trigger 19 and the pick-up 20 ascertains an excessively low intensity and adds a corresponding item of information to the transmission signal to be transmitted to the receiver 4, then the analyzer 6 causes the constant-current source 10 to be switched on again. As a result, constant current is again fed to the integrator 12 and its output signal is increased until the intensity of the optical beam received in the transceiver 13 is sufficiently high once again. What is produced, then, is a closed regulating circuit which is embedded directly in the closed loop including the transmitter 3, the transceiver 13 and the receiver 4. This regulating circuit is particularly distinguished by the fact that the variable to be regulated is determined directly at the load, in this case at the transceiver 13. Therefore, all of the influencing variables which influence the transmission of the optical beam from the transmitter 3 to the receiver 13 and of the transmission signal from the transceiver 13 to the receiver 4, are implicitly taken into account.

The device according to the invention allows a connection between a corresponding transmitter and a corresponding receiver. The connection is implemented through an optical beam and a transmission signal to be effected by the latter. The connection is to be established in an automated and multiply repeatable manner, wherein aging and other drift effects in the transmitter and/or the receiver are reliably compensated for.

Aging effects can occur particularly in semiconductor lasers used to generate the optical beam in the transmitter. An example of how these aging effects are expressed is when a value for a laser current that was set before a deactivation suffices, but after restarting only an optical beam with an intensity which is too low is generated. It is thus necessary to readjust the laser current. In the context of the present invention, the detection of the excessively low intensity and the readjustment of the laser current and thus of the intensity then take place automatically. In particular, the laser current can also be controlled in this case by an output of an integrator. The latter ensures that the laser current is increased continuously until the generated optical beam has a sufficient intensity. The laser current can then be kept constant for the time being at the value which is reached.

The invention is particularly suitable for use in a measuring system in an electrical power distribution network, where the measuring system may have an extremely high electrical potential. In this case, the automatic start-up that has been described, in particular after an interruption in the supply voltage of the device, affords advantages over the manual start-up that is customary in the prior art. That is because in the case of an application in a power distribution network, very rapid reconnection is often required and the device can also be positioned at locations which are only accessible with difficulty.

We claim:

1. A device for receiving a transmission signal and for transmitting an optical beam, the device comprising:
    a transmitter for transmitting an optical beam having an adjustable intensity, said transmitter having a controller for setting the intensity;
    a receiver for receiving a transmission signal effected by the optical beam, said receiver having an analyzer for outputting a threshold signal if the transmission signal has a strength exceeding a predetermined limit value;
    a pick-up for outputting a start signal for starting the transmission signal; and
    a control unit connected to said analyzer, to said pick-up and to said controller, said control unit driving said controller, after reception of the start signal from said pick-up, for causing said controller to set the intensity to a value increasing continuously from substantially zero until said analyzer outputs the threshold signal, and said control unit then leaving said controller unchanged until reception of a new start signal.

2. The device according to claim 1, including a regulator connected to said receiver, to said transmitter, to said analyzer and to said controller, for enabling the intensity to be regulated after the threshold signal has been output.

3. The device according to claim 1, wherein said control unit has an integrator for receiving a constant signal for integration, said integrator connected to said controller for setting the intensity as a function of an integral of the constant signal.

4. The device according to claim 1, including a transceiver connected between said transmitter and said receiver, said transceiver receiving the optical beam from said transmitter and transmitting the transmission signal to said receiver.

5. The device according to claim 4, wherein said transmitter and said transceiver are set up for supplying power to said transceiver through the optical beam.

6. The device according to claim 4, wherein said transceiver contains a measuring unit for transmitting measurement data from said measuring unit to said receiver with the transmission signal.

7. The device according to claim 4, wherein:
    said transceiver has a configuration for performing a comparison of the intensity with the limit value and for adding information about the comparison to the transmission signal; and
    said analyzer and said control unit are set up for setting the intensity to a continuously rising value if, according to the information, the intensity lies below the limit value.

8. The device according to claim 1, including an optical waveguide connected to said transmitter for guiding the optical beam.

9. The device according to claim 8, wherein the transmission signal is an optical signal.

10. The device according to claim 9, including another optical waveguide connected to said receiver for guiding the transmission signal.

11. The device according to claim 1, wherein the transmission signal is an optical signal, and a single optical waveguide guides the optical beam and the transmission signal.

12. A method of using the device according to claim 1, which comprises:
    supplying a measuring unit with power through the optical beam;
    outputting the transmission signal from said measuring unit; and
    guiding the transmission signal output by the measuring unit to said receiver.

13. The method according to claim 12, which further comprises connecting the measuring unit to an electrical power distribution network for carrying out measurements.

* * * * *